United States Patent
Fulay et al.

(10) Patent No.: US 9,723,242 B1
(45) Date of Patent: Aug. 1, 2017

(54) VIDEO CONFERENCING SYSTEM AND METHOD

(71) Applicant: Google Inc., Mountain View, CA (US)

(72) Inventors: Amit Fulay, Seattle, WA (US); Chee H. Chew, Redmond, WA (US); Ming Zhang, Sammamish, WA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/318,424

(22) Filed: Jun. 27, 2014

Related U.S. Application Data

(60) Provisional application No. 61/840,139, filed on Jun. 27, 2013.

(51) Int. Cl.
| | |
|---|---|
| *G11B 27/00* | (2006.01) |
| *H04N 5/44* | (2011.01) |
| *H04N 5/445* | (2011.01) |
| *H04L 12/58* | (2006.01) |

(52) U.S. Cl.
CPC ......... *H04N 5/4403* (2013.01); *H04L 51/046* (2013.01); *H04N 5/44591* (2013.01)

(58) Field of Classification Search
CPC .. G06F 17/212; G06F 3/04842; H04M 3/565; H04M 3/567

USPC .......................................................... 386/278
See application file for complete search history.

(56) References Cited

U.S. PATENT DOCUMENTS

| | | | |
|---|---|---|---|
| 8,019,815 B2 * | 9/2011 | Keener, Jr. ............... | H04N 7/15 709/204 |
| 2009/0220064 A1 * | 9/2009 | Gorti ...................... | H04M 3/56 379/202.01 |
| 2012/0023407 A1 * | 1/2012 | Taylor ................... | G06F 9/4443 715/731 |
| 2012/0224021 A1 * | 9/2012 | Begeja .................. | H04N 7/147 348/14.08 |

* cited by examiner

*Primary Examiner* — Thai Tran
*Assistant Examiner* — Jose Mesa
(74) *Attorney, Agent, or Firm* — IP Spring

(57) ABSTRACT

A method and computing system for generating a temporal timebase that temporally-associates one or more portions of a video associated with a videoconference with one or more data events defined via a viewer application. A specific portion of the video associated with the video conference is rendered, wherein the specific portion is chosen from the one or more portions. The temporal timebase is accessed to identify a specific data event, chosen from the one or more data events, that is temporally-associated with the specific portion of the video associated with the video conference. The specific data event may be rendered within the viewer application.

18 Claims, 4 Drawing Sheets

VIDEO CONFERENCING SYSTEM AND METHOD

TECHNICAL FIELD

This disclosure relates to temporal syncing and, more particularly, to temporally syncing a video feed of a video conference with one or more viewer applications.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to video conference with each other. As video conferencing adds a video component to a communication session, such communication sessions tend to be more enjoyable for the participants. Unfortunately, video conferences typically only allow for a limited number of participants, often resulting in the exclusion of many who would have liked to participate. Accordingly, some videoconferences may be broadcast to a larger audience; and recordings of such broadcasts may be made available for subsequent review. However, such broadcast recordings may be devoid of the data events that were available to the broadcast audience during the original broadcast.

SUMMARY OF DISCLOSURE

In one implementation, a computer-implemented method includes generating a temporal timebase that temporally-associates one or more portions of a video associated with a videoconference with one or more data events defined via a viewer application. The viewer application includes one or more of: a question submission application, an applause generation application, a feedback submission application, a file submission application, and a chatting application. The specific data event includes one or more of: a temporal question submitted via the question submission application, a temporal applause score generated via the applause generation application, a temporal feedback score generated via the feedback submission application, a temporal data file submitted via the file submission application, and a temporal chat entry submitted via the chatting application. A specific portion of the video associated with the video conference is rendered, wherein the specific portion is chosen from the one or more portions. The temporal timebase is accessed to identify a specific data event, chosen from the one or more data events, that is temporally-associated with the specific portion of the video associated with the video conference. The specific data event is rendered within the viewer application.

In another implementation, a computer-implemented method includes generating a temporal timebase that temporally-associates one or more portions of a video associated with a videoconference with one or more data events defined via a viewer application. A specific portion of the video associated with the video conference is rendered, wherein the specific portion is chosen from the one or more portions. The temporal timebase is accessed to identify a specific data event, chosen from the one or more data events, that is temporally-associated with the specific portion of the video associated with the video conference. The specific data event may be rendered within the viewer application.

One or more of the following features may be included. The video associated with the video conference may be a live video feed of the video conference. A user may be enabled to select a temporally-earlier portion of the video associated with the video conference, wherein the temporally-earlier portion is chosen from the one or more portions of the video associated with a videoconference. The temporally-earlier portion of the video associated with the video conference may be rendered.

The video associated with the video conference may be a prerecorded video of the video conference. A user may be enabled to select a temporally-different portion of the video associated with the video conference, wherein the temporally-different portion is chosen from the one or more portions of the video associated with a videoconference. The temporally-different portion of the video associated with the video conference may be rendered.

The viewer application may include one or more of: a question submission application; an applause generation application; a feedback submission application; a file submission application; and a chatting application. The specific data event may include one or more of: a temporal question submitted via the question submission application; a temporal applause score generated via the applause generation application; a temporal feedback score generated via the feedback submission application; a temporal data file submitted via the file submission application; and a temporal chat entry submitted via the chatting application.

Rendering a specific portion of the video associated with a video conference may include receiving an input from a user identifying the specific portion of the video associated with the video conference that the user wishes to view.

In another implementation, a computing system includes a processor and memory configured to perform operations including generating a temporal timebase that temporally-associates one or more portions of a video associated with a videoconference with one or more data events defined via a viewer application. A specific portion of the video associated with the video conference is rendered, wherein the specific portion is chosen from the one or more portions. The temporal timebase is accessed to identify a specific data event, chosen from the one or more data events, that is temporally-associated with the specific portion of the video associated with the video conference. The specific data event may be rendered within the viewer application.

One or more of the following features may be included. The video associated with the video conference may be a live video feed of the video conference. A user may be enabled to select a temporally-earlier portion of the video associated with the video conference, wherein the temporally-earlier portion is chosen from the one or more portions of the video associated with a videoconference. The temporally-earlier portion of the video associated with the video conference may be rendered.

The video associated with the video conference may be a prerecorded video of the video conference. A user may be enabled to select a temporally-different portion of the video associated with the video conference, wherein the temporally-different portion is chosen from the one or more portions of the video associated with a videoconference. The temporally-different portion of the video associated with the video conference may be rendered.

The viewer application may include one or more of: a question submission application; an applause generation application; a feedback submission application; a file submission application; and a chatting application. The specific data event may include one or more of: a temporal question submitted via the question submission application; a temporal applause score generated via the applause generation application; a temporal feedback score generated via the feedback submission application; a temporal data file submitted via the file submission application; and a temporal chat entry submitted via the chatting application.

Rendering a specific portion of the video associated with a video conference may include receiving an input from a user identifying the specific portion of the video associated with the video conference that the user wishes to view.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
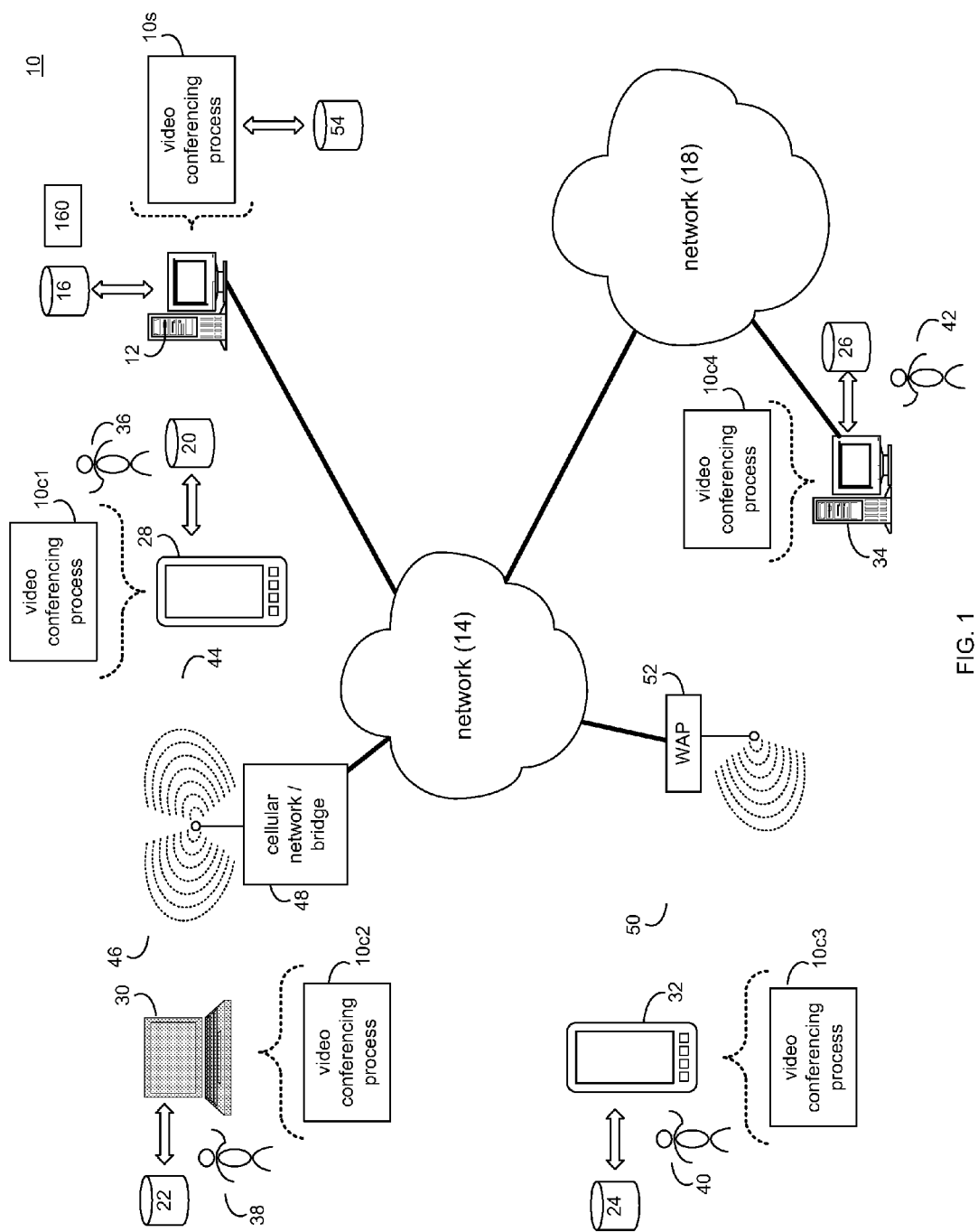
FIG. 1 is a diagrammatic view of a distributed computing network including a computing device that executes a video conferencing process according to an implementation of the present disclosure.
Figure 2:
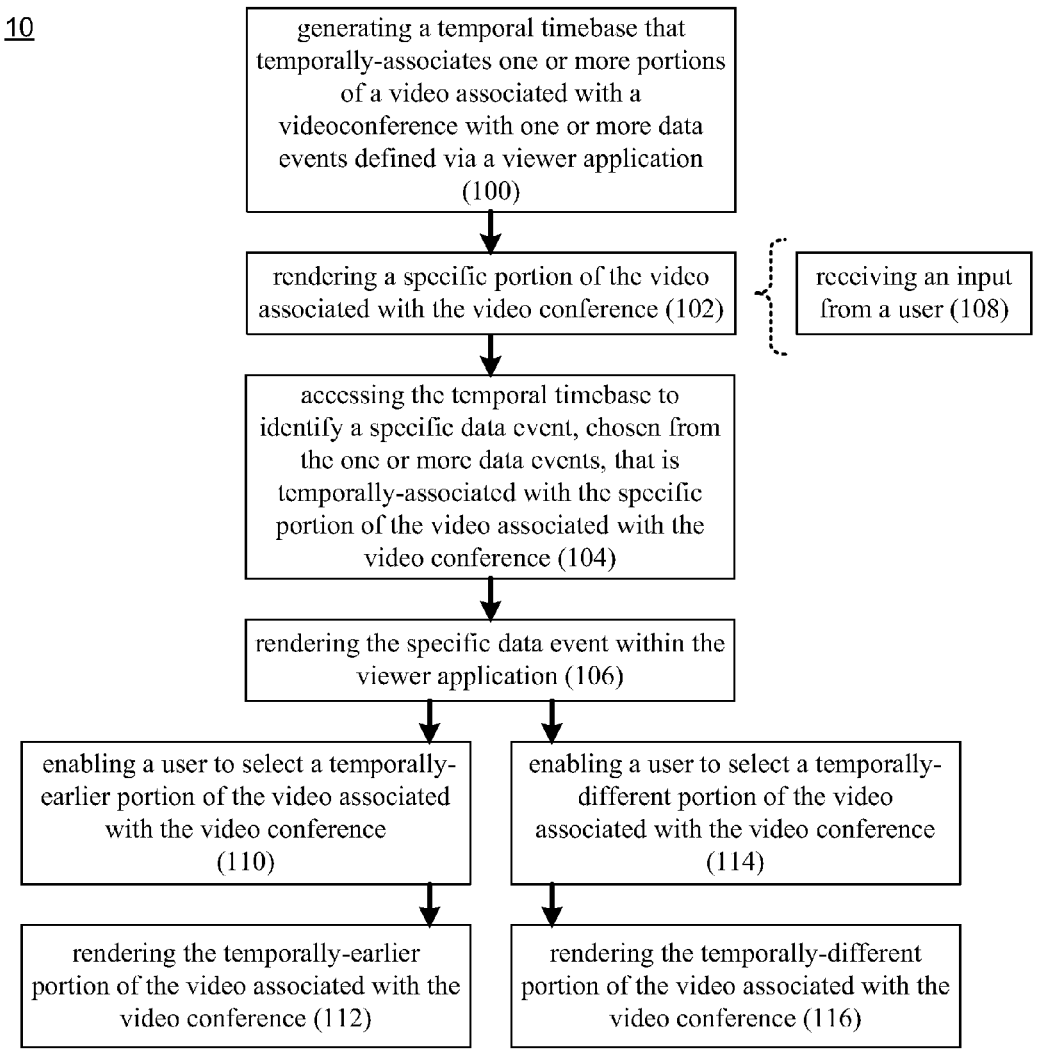
FIG. 2 is a flowchart of the video conferencing process of FIG. 1 according to an implementation of the present disclosure.

In FIGS. 1 & 2, there is shown video conferencing process 10. Video conferencing process 10 may be implemented as a server-side process, a client-side process, or a hybrid server-side/client-side process. For example, video conferencing process 10 may be implemented as a purely server-side process via video conferencing process 10s. Alternatively, video conferencing process 10 may be implemented as a purely client-side process via one or more of video conferencing process 10c1, video conferencing process 10c2, video conferencing process 10c3, and video conferencing process 10c4. Alternatively still, video conferencing process 10 may be implemented as a hybrid server-side/client-side process via video conferencing process 10s in combination with one or more of video conferencing process 10c1, video conferencing process 10c2, video conferencing process 10c3, and video conferencing process 10c4. Accordingly, video conferencing process 10 as used in this disclosure may include any combination of video conferencing process 10s, video conferencing process 10c1, video conferencing process 10c2, video conferencing process 10c3, and video conferencing process 10c4.

As will be discussed below in greater detail, video conferencing process 10 may generate 100 a temporal timebase (e.g., temporal timebase 54) that may temporally-associate one or more portions of a video associated with a video-conference with one or more data events defined via a viewer application. A specific portion of the video associated with the video conference may be rendered 102, wherein the specific portion may be chosen from the one or more portions. The temporal timebase (e.g., temporal timebase 54) may be accessed 104 to identify a specific data event (chosen from the one or more data events) that is temporally-associated with the specific portion of the video associated with the video conference. The specific data event may be rendered 106 within the viewer application.

Video conferencing process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of video conferencing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of video conferencing processes 10c1, 10c2, 10c3, 10c4 may include but are not limited to a web browser, a web browser plug-in or applet, a game console user interface, a video conference user interface, or a specialized application (e.g., an application running on e.g., the Android platform or the iOS platform). The instruction sets and subroutines of video conferencing processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown), wearable computer (not shown), head mounted display (not shown), glasses (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Users of social networks may be able to participate in group communication sessions. For example, users of social networks may participate in multiuser videoconferences that allow for virtual gatherings of people so that they may chat about specific topics. For example, video conferencing process 10 may be included within or utilized by any social network.

Video Conferencing Process

Figure 3:
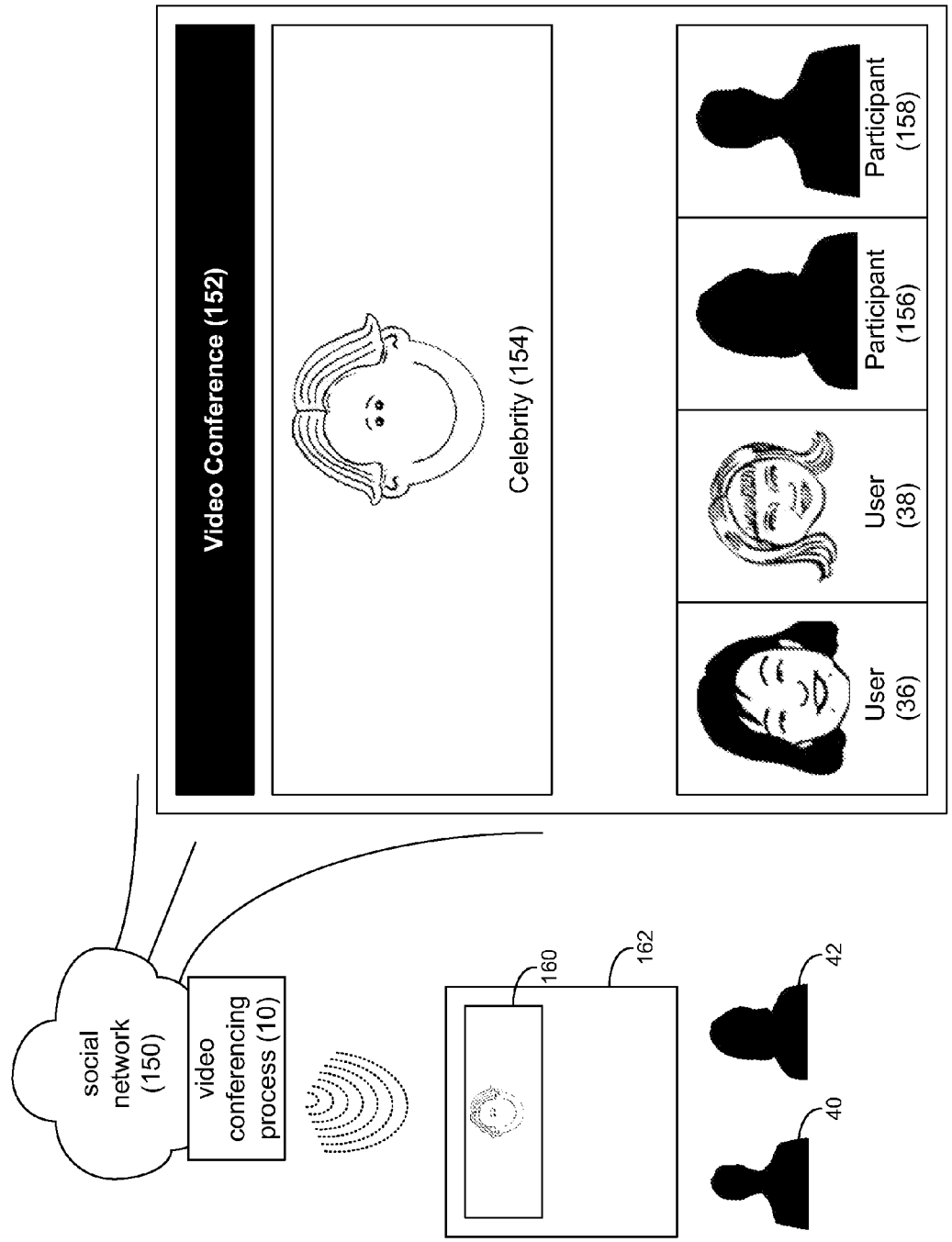
FIG. 3 is a diagrammatic view of a videoconference managed by the video conferencing process of FIG. 1 according to an implementation of the present disclosure.

Referring also to FIG. 3, assume for illustrative purposes that users 36, 38, 40, 42 are all members of social network 150. Further, assume that a videoconference (e.g. video conference 152) will be hosted by a celebrity (e.g. celebrity 154). During videoconference 152, celebrity 154 may interact with various participants of videoconference 152. Assume for illustrative purposes that celebrity 154 is a popular celebrity and videoconference 152 may only accommodate a defined number of participants (e.g. a maximum of ten participants). Further, assume that users 36, 38 were selected to participate in video conference 152 (along with participants 156, 158) and that users 40, 42 were not selected to participate in videoconference 152.

While the following discussion concerns videoconference 152 being executed within social network 150, this is for illustrative purposes only and is not intended to be a limitation of this disclosure, as other configurations are possible. For example, videoconference 152 may occur outside of social network 150 by way of e.g. a stand-alone communications application/product (not shown). For illustrative purposes, further assume that videoconference 152 may occur through computing device 12, wherein (in this example) users 36, 38 may access videoconference 152 via client electronic devices 28, 30 (respectively).

In order to provide videoconference 152 to an audience larger than e.g., ten people, video conferencing process 10 may be configured to provide a broadcast of videoconference 152 (in the form of video 160). Video 160 may be provided to users of videoconferencing process 10 who were e.g. not selected to participate in videoconference 152 (e.g. users 40, 42). For example, video 160 may be broadcast to e.g. users 40, 42 via network 14 and/or network 18 so that video 160 may be received by client electronic devices 32, 34 (respectively) and rendered by user interface 162 (e.g., a video sharing or viewing platform).

Figure 4:
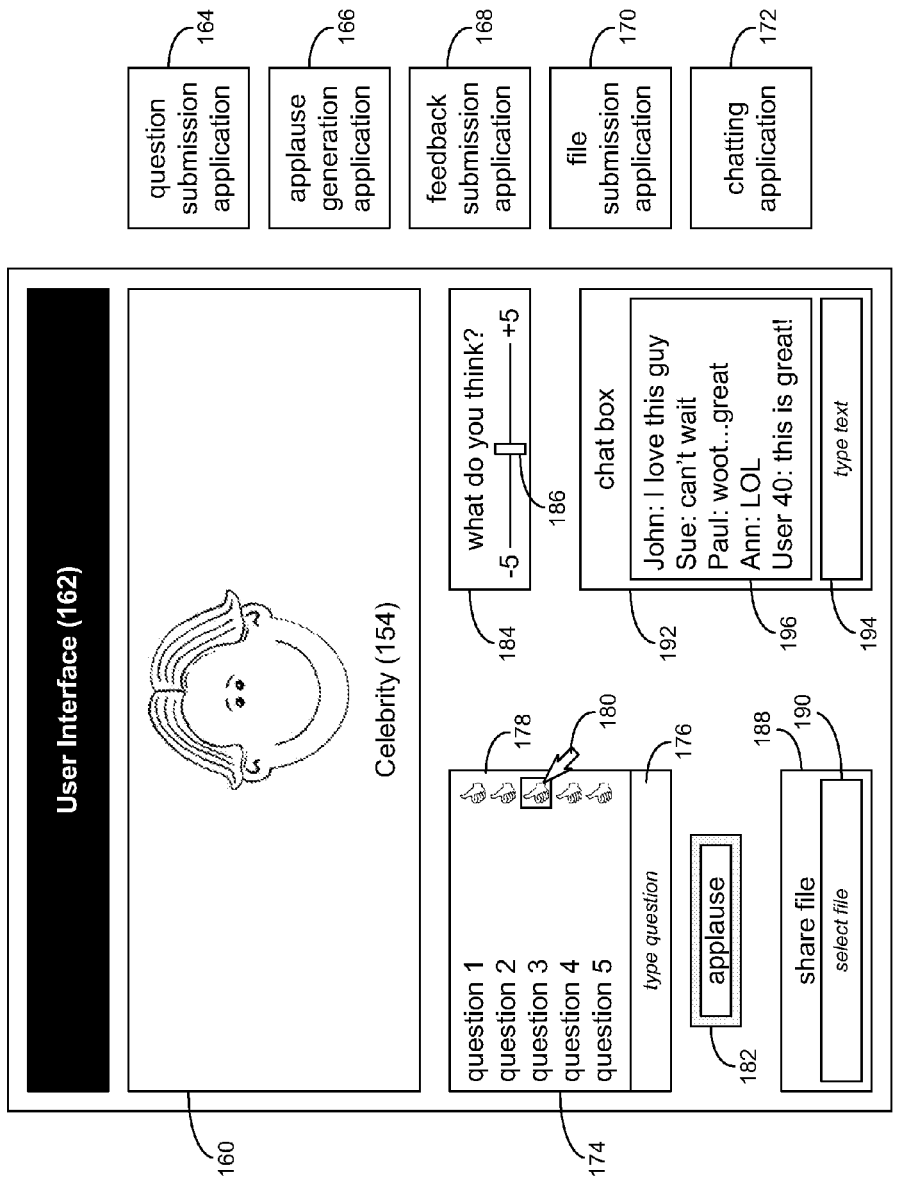
FIG. 4 is a diagrammatic view of a user interface rendered by the video conferencing process of FIG. 1 according to an implementation of the present disclosure.

Referring also to FIG. 4, video conferencing process 10 may include and/or may execute various viewer applications, each of which may be utilized by the viewers of video 160 (e.g. users 40, 42) to interact with celebrity 154. Examples of such viewer applications may include but are not limited to: question submission application 164; applause generation application 166; feedback submission application 168; file submission application 170; and chatting application 172. Which (if any) of viewer applications 164, 166, 168, 170, 172 are made available to the viewers of video 160 (e.g. users 40, 42) may be controlled/decided by celebrity 154, a host of video conference 152 and/or an administrator of videoconference 152. For example, if celebrity 154 is participating in videoconference 152 so that celebrity 154 may issue a prepared statement (concerning their upcoming movie) to viewers of video 160, celebrity 154 may not be interested in answering any questions and, therefore, may prohibit the use of question submission application 164.

Question submission application 164 (which may be a portion of/included within/controlled by video conferencing process 10) may be configured to allow e.g. users 40, 42 to submit one or more questions that may be presented to celebrity 154 for potential answering. For example, question submission application 164 may render question area 174 within user interface 162. Question area 174 may contain question field 176 that may be configured to allow users 40, 42 to enter a question and submit the same to celebrity 154. For example, if user 40 wishes to ask a question of celebrity 154, user 40 may type the question into question field 176 and e.g. hit enter, which may result in the question entered appearing within question queue 178.

The specific order in which the individual questions (e.g. question 1, question 2, question 3, question 4, question 5) appear within question queue 178 may vary depending upon the user rating received for each question. For example, question submission application 164 may be configured to allow the various viewers of video 160 to opine on specific questions included within question queue 178. Specifically, in some implementations question submission application 164 may be configured to allow a viewer (e.g. user 40, 42) to provide their opinion (in the form of a thumbs-up) for a specific question by e.g. selecting (via on-screen pointer 180) the thumbs-up icon positioned proximate the appropriate question. Accordingly, the more people that select the thumbs-up icon associated with a specific question, the higher that question is ranked and, accordingly, the higher it may appear within question queue 178. Additionally, celebrity 154 may monitor the position of the various questions included within question queue 178 and may choose to address the most popular questions (e.g. the most highly ranked questions) within question queue 178.

In various implementations, in the event that celebrity 154 selects a highly ranked question for answering, the viewer who asked (via the question submission location 164) the selected question may be invited (by celebrity 154) to participate in videoconference 152 so that the viewer may directly ask the question of celebrity 154. Since (as discussed above) videoconference 152 may have a defined maximum number of participants, in order to add a new participant to video conference 152, an existing participant may need to leave videoconference 152.

As discussed above, once a question is asked by a viewer of video 160 and placed within question queue 178, that particular question may be available for viewers (e.g. users 40, 42) to provide their opinion concerning that question by e.g., selecting the thumbs-up icon associated with the question. The questions that are asked earlier in videoconference 152 have a greater amount of time to receive positive feedback from the viewers of video 160. Accordingly, questions that are asked earlier on in videoconference 152 may tend to be ranked more highly than questions that are asked later on in videoconference 152. Therefore, in some implementations question submission application 164 may be configured to take into account and offset such voting time disparities by e.g. promoting later-submitted questions to subgroups of viewers of video 160 so that such later submitted questions may be "thrust into the spotlight" to promote visibility for voting purposes.

In some instances, people may not like providing negative feedback. Accordingly, while question submission application 164 may be configured to allow a user to provide positive feedback (by e.g., selecting a thumbs-up icon), in various implementations question submission application 164 may not be configured to allow a user to provide negative feedback (by e.g., selecting a thumbs-down icon). In an example implementation, question submission application 164 may be configured to infer negative signals based upon the actions of a viewer. For example, if user 40 provided positive feedback for question 3 (but failed to provide any feedback for question 1, question 2, question 4 and question 5), question submission application 164 may infer negative feedback from user 40 for question 1, question 2, question 4 and question 5, as user 40 has demonstrated that they are willing to provide positive feedback when warranted.

Applause generation application 166 (which may be a portion of/included within/controlled by video conferencing process 10) may be configured to render applause button 182 that may allow viewers of video 160 to submit temporal applause to e.g. celebrity 154 whenever they like what celebrity 154 is saying/doing. For example, assume that celebrity 154 is discussing the fact that they are currently being considered for the leading role in what will most likely be a blockbuster movie. Upon hearing this, user 40 may select (via on-screen pointer 180) applause button 182, resulting in applause generation application 166 generating temporal applause that may be provided to user 154 in real time. For example and upon sensing the selection of applause button 182 by user 40, applause generation process 166 may be configured to render an audio applause file so that celebrity 154 physically hears the applause on the computer/at the studio where video conference 150 is being performed. Applause generation application 166 may assign a score to the temporal applause generated by e.g., user 40 depending upon the duration of such temporal applause. Such applause from user 40 may be averaged with applause provided by other viewers of video 160 (e.g., user 42) to generate consolidated applause, which may be provided to celebrity 154 in real time (e.g., in the form of a rendered audio signal).

Feedback submission application 168 (which may be a portion of/included within/controlled by video conferencing process 10) may be configured to render feedback submission area 184 that may allow viewers of video 160 to submit feedback to e.g. celebrity 154 concerning what celebrity 154 is currently saying/doing. For example, assume that celebrity 154 is discussing their position on various controversial issues, some of which user 40 agrees with and some of which user 40 does not agree with. Accordingly, user 40 may move slider 186 included within feedback submission area 184 to the left whenever user 40 disagrees with what celebrity 154 is saying. Conversely, user 40 may move slider 186 included within feedback submission area 184 to the right whenever user 40 agrees with what celebrity 154 is saying. Such feedback from user 40 may be averaged with feedback provided by other viewers of video 160 (e.g., user 42) to generate consolidated feedback, which may be provided to celebrity 154 in real time (e.g., in the form of a scrolling line chart or bar graph). This consolidated feedback may be parsed based upon demographic data prior to being provided to e.g., celebrity 154. For example, with user consent this consolidated feedback may be divided based upon age, gender, race, sexual orientation, wealth, education, marital status, etc. Therefore, in an example scenario such consolidated feedback may inform celebrity 154 that they do very well with single women in the 18-35 age group but not so well with married men in the 36-54 age group.

File submission application 170 (which may be a portion of/included within/controlled by video conferencing process 10) may be configured to render file share portion 188 that may allow a viewer of video 160 to share one or more files with e.g., celebrity 154, participants within video conference 152, and/or other viewers of video 160. For example, assume for illustrative purposes that user 40 wishes to share a photograph of celebrity 154 that user 40 took in Las Vegas. Accordingly, user 40 may identify and locate the appropriate photograph file within file location window 190 of file share portion 188 and upload the same to video conferencing process 10. Upon receiving such a photographic file, video conferencing process 10 may make this photographic file available to e.g., celebrity 154, participants within video conference 152, and/or other viewers of video 160.

In some implementations, chatting application 172 (which may be a portion of/included within/controlled by video conferencing process 10) may be configured to render chat portion 192 that may allow the viewers of video 160 to communicate (via e.g., text messages) with each other, celebrity 154, and/or participants of video conference 152 during the broadcast of video 160. For example, assume for illustrative purposes that user 40 wishes to share the text "this is great!" with the other viewers of video 60. Accordingly, user 40 may enter "this is great!" into text entry field 194 of chat portion 192 and may hit enter, resulting in "this is great!" being posted within text window 196.

While video 160 is discussed above as being a live feed from video conference 152, this is for illustrative purposes only and is not intended to be a limitation of this disclosure, as other configurations are possible and are considered to be within the scope of this disclosure. For example, video conferencing process 10 may be configured to store video 160 (e.g., on storage device 16 of computing device 12) so that video 160 may be subsequently reviewed by e.g., fans of celebrity 154 who were not able to watch the live broadcast of video 160.

Video conferencing process 10 may generate 100 temporal timebase 54 (FIG. 1) that may be configured to temporally-associate one or more portions of video 160 (associated with videoconference 152) with one or more data events defined via the viewer applications (e.g., question submission application 164, applause generation application 166, feedback submission application 168, file submission application 170, and chatting application 172). Examples of such data events may include but are not limited to one or more of: a temporal question submitted via question submission application 164; a temporal applause score generated via applause generation application 166; a temporal feedback score generated via feedback submission application 168; a temporal data file submitted via file submission application 170; and a temporal chat entry (e.g., a text message) submitted via chatting application 172.

In various implementations, the temporal aspects of these data events that are collected/generated by e.g., question submission application 164, applause generation application 166, feedback submission application 168, file submission application 170, and chatting application 172 may be stored within temporal timebase 54.

For example and with respect to question submission application 164, temporal timebase 54 may define the time (with respect to video 160) at which each question asked by a viewer was submitted (via question submission application 164) and the time at which that same question was answered by celebrity 154. Therefore, if at a subsequent time/date, a viewer of video 160 wishes to obtain the answer to a specific question that was asked of celebrity 154, temporal timebase 54 may identify the specific point within video 160 at which the specific question was answered by celebrity 154.

Further and with respect to applause application 166, temporal timebase 54 may define the time (with respect to video 160) at which each viewer of video 160 submitted applause for celebrity 154 (via applause submission application 166). Therefore, if at a subsequent time/date, a viewer of video 160 wishes to determine the level of applause received by celebrity 154 at a specific point within video 160, temporal timebase 54 may provide information concerning the level of applause submitted by the viewers at that specific point within video 160.

And with respect to feedback submission application 166, temporal timebase 54 may define the time (with respect to video 160) at which each viewer of video 160 submitted feedback for celebrity 154 (via feedback submission application 168). Therefore, if at a subsequent time/date, a viewer of video 160 wishes to determine the feedback received by celebrity 154 at a specific point within video 160, temporal timebase 54 may provide information concerning the feedback submitted by the viewers at that specific point within video 160.

Additionally and with respect to file submission application 170, temporal timebase 54 may define the time (with respect to video 160) at which each file submission was made by a viewer of video 160 (via file submission application 170). Therefore, if at a subsequent time/date, a viewer of video 160 wishes to determine the specific point within video 160 at which a viewer shared a particular file, temporal timebase 54 may provide information concerning the specific point within video 160 at which the file submission was made by the viewer.

Further and with respect to chatting application 172, temporal timebase 54 may define the time (with respect to video 160) at which each viewer of video 160 submitted a text message (via chat application 172). Therefore, if at a subsequent time/date, a viewer of video 160 wishes to determine the text messages posted at a specific point within video 160, temporal timebase 54 may provide information concerning the text messages submitted by the viewers at that specific point within video 160.

For example, assume that user 42 wishes to view video 160 at a later date. Accordingly, user 42 may access video conferencing process 10 via e.g., client electronic device 34 and select video 160 (which, as discussed above, may be stored within storage device 16 of computing device 12).

Accordingly, video conferencing process 10 may render 102 video 160 within user interface 162. During the process of rendering video 160, question submission application 164, applause generation application 166, feedback submission application 168, file submission application 170, and/or chatting application 172 may be configured to provide their respective temporally-relevant data events to user 42.

For example, assume that during the course of viewing video 160, video conferencing process 10 receives 108 an input from user 42 identifying a specific portion of video 160 (associated with video conference 152) that user 42 wishes to view. For example, assume that this specific portion of video 160 begins at a temporal point that is ten minutes and thirty-two seconds (@10:32) into video 160, wherein celebrity 154 begins to discuss their potential retirement (e.g., a controversial topics amongst fans of celebrity 154).

Video conferencing process 10 may access 104 temporal timebase 54 to identify one or more specific data events (chosen from one or more data events defined within temporal timebase 54) that are temporally-associated with the specific portion (@10:32) of video 160 associated with video conference 152. For example, what questions were asked of/answered by celebrity 154 proximate position 10:32 of video 160; how much applause was received by celebrity 154 proximate position 10:32 of video 160; what feedback was received by celebrity 154 proximate position 10:32 of video 160; what files were shared by the viewers of video 160 proximate position 10:32 of video 160; and what text messages were posted by viewers of video 160 proximate position 10:32 of video 160

Once such data event(s) are identified, video conferencing process 10 may render 106 such specific data event(s) within the appropriate viewer application (e.g., question submission application 164, applause generation application 166, feedback submission application 168, file submission application 170, and/or chatting application 172).

For example, question submission application 164 may render 106 the questions that were asked of and/or the answers that were provided by celebrity 154 proximate position 10:32 of video 160; applause generation application 166 may render 106 the level of applause received by celebrity 154 proximate position 10:32 of video 160; feedback submission application 168 may render 106 the type of feedback that was received by celebrity 154 proximate position 10:32 of video 160; file submission application 170 may render 106 the files that were shared by the viewers of video 160 proximate position 10:32 of video 160; and chatting application 172 may render 106 the text messages that were posted by viewers of video 160 proximate position 10:32 of video 160.

Accordingly, as user 42 watches video 160, the various viewer applications (e.g., question submission application 164, applause generation application 166, feedback submission application 168, file submission application 170, and/or chatting application 172) may provide information to user 42 (in the form of data events) that shows e.g., the temporarily-relevant questions asked, answered provided, applause received, feedback received, files shared, and text-message posted during the portion of video 160 that is currently being rendered 102 by video conferencing process 10.

As discussed above, video 160 may be a live video feed that is broadcast to viewers (e.g., user 40, 42) at the time of video conference 152. Alternatively, video 160 may be a file that is viewed at some time after live video conference 152.

If video 160 is a live video feed of video conference 152, video conferencing process 10 may enable 110 a user (e.g., user 40) to select a temporally-earlier portion of video 160, and video conferencing process 10 may render 112 this temporally-earlier portion of video 160. For example, if user 40 is currently watching a live broadcast of video 160 (@15:45), video conferencing process 10 may enable 110 user 40 to select a temporally-earlier portion of video 160 (e.g., @8:32) and video conferencing process 10 may render 112 this temporally-earlier portion of video 160 (e.g., @8:32). While user 40 may "rewind" the broadcast of video 160, user 40 may not "fast forward" the broadcast of video 160 (as it is a live broadcast).

If video 160 is a prerecorded video of video conference 152, video conferencing process 10 may enable 114 a user (e.g., user 40) to select a temporally-different portion of video 160, and video conferencing process 10 may render 116 this temporally-different portion of video 160. For example, if user 40 is currently watching a prerecorded-version of video 160 (@15:45), video conferencing process 10 may enable 114 user 40 to select a temporally-different portion of video 160 (e.g., @8:32 or @ 21:36) and video conferencing process 10 may render 116 this temporally-different portion of prerecorded video 160 (e.g., @8:32 or @ 21:36). Since video 160 is prerecorded, user 40 may "rewind" or "fast forward" video 160.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium and or nontransitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal or electronic signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In situations where a system collects and/or uses personal information about users, or may make use of personal information, the users may be provided with an opportunity to control whether programs or features collect user information (e.g., information about a user's social network, social actions or activities, profession, a user's preferences, or a user's current location), or to control whether and/or how to receive content. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location cannot be determined. Thus, the user may have control over how information is collected and used.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising: generating a temporal timebase that temporally-associates one or more previously captured portions of a video associated with a video conference with one or more previously received data events defined via a viewer application, wherein: the viewer application includes one or more of: a question submission application, an applause generation application, a feedback submission application, a file submission application, and a chatting application, and each of the previously received data events includes two or more temporal questions and a first viewer rating for each of the temporal questions submitted via the question submission application, wherein the two or more temporal questions are ordered based on the respective first viewer rating, and at least one or more of: a temporal applause score generated via the applause generation application, a temporal feedback score of feedback received, the temporal feedback score being generated via the feedback submission application and demographic information for viewers providing the feedback, a temporal data file submitted via the file submission application, and a temporal chat entry submitted via the chatting application; rendering a specific portion of the video associated with the video conference, wherein the specific portion is chosen from the one or more previously captured portions; accessing the temporal timebase to identify a stored viewer response data event, chosen from the one or more previously received data events, that is temporally-associated with the specific portion of the video associated with the video conference; determining a level of the stored viewer response data event; and rendering the stored viewer response data event within the viewer application and providing information associated with the level.

2. A computer-implemented method comprising: generating a temporal timebase that temporally-associates one or more previously captured portions of a video associated with a video conference with one or more previously received data events defined via a viewer application, wherein at least one of the previously received data events includes at least two second viewer questions and a first viewer rating of individual of the at least two second viewer questions, wherein the at least two second viewer questions are ordered based on the respective first viewer rating; rendering a specific portion of the video associated with the video conference, wherein the specific portion is chosen from the one or more previously captured portions; accessing the temporal timebase to identify a stored viewer response data event, chosen from the one or more previously received data events, that is temporally-associated with the specific portion of the video associated with the video conference; determining a level of the stored viewer response data event; and rendering the stored viewer response data event within the viewer application and providing information associated with the level.

3. The computer-implemented method of claim 2 wherein the video associated with the video conference is a live video feed of the video conference.

4. The computer-implemented method of claim 3 further comprising:
   enabling a user to select a temporally-earlier portion of the video associated with the video conference, wherein the temporally-earlier portion is chosen from the one or more previously captured portions of the video associated with the video conference.

5. The computer-implemented method of claim 2 wherein the video associated with the video conference is a prereceived video of the video conference.

6. The computer-implemented method of claim 5 further comprising:
   enabling a user to select a temporally-different portion of the video associated with the video conference, wherein the temporally-different portion is chosen from the one or more previously captured portions of the video associated with the video conference.

7. The computer-implemented method of claim 6 further comprising:
   rendering the temporally-different portion of the video associated with the video conference.

8. The computer-implemented method of claim 2 wherein the viewer application includes one or more of:

a question submission application;
an applause generation application;
a feedback submission application;
a file submission application; and
a chatting application.

9. The computer-implemented method of claim 8 wherein the stored viewer response data event includes one or more of:
   a temporal question submitted via the question submission application;
   a temporal applause score generated via the applause generation application;
   a temporal feedback score generated via the feedback submission application;
   a temporal data file submitted via the file submission application; and
   a temporal chat entry submitted via the chatting application.

10. The computer-implemented method of claim 2 wherein rendering a specific portion of the video associated with a video conference includes:
   receiving an input from a user identifying the specific portion of the video associated with the video conference that the user wishes to view.

11. A computing system including a processor and memory configured to perform operations comprising: generating a temporal timebase that temporally-associates one or more previously captured portions of a video associated with a video conference with one or more previously received data events defined via a viewer application wherein at least one of the previously received data events includes at least two second viewer questions and a first viewer rating of individual of the at least two second viewer questions, wherein the at least two second viewer questions are ordered based on the respective first viewer rating; rendering a specific portion of the video associated with the video conference, wherein the specific portion is chosen from the one or more previously captured portions; accessing the temporal timebase to identify a stored viewer response data event, chosen from the one or more previously received data events, that is temporally-associated with the specific portion of the video associated with the video conference; determining a level of the stored viewer response data event; and rendering the stored viewer response data event within the viewer application and providing information associated with the level.

12. The computing system of claim 11 wherein the video associated with the video conference is a live video feed of the video conference.

13. The computing system of claim 12 further configured to perform operations comprising:
   enabling a user to select a temporally-earlier portion of the video associated with the video conference, wherein the temporally-earlier portion is chosen from the one or more previously captured portions of the video associated with the video conference.

14. The computing system of claim 11 wherein the video associated with the video conference is a prereceived video of the video conference.

15. The computing system of claim 14 further configured to perform operations comprising:
   enabling a user to select a temporally-different portion of the video associated with the video conference, wherein the temporally-different portion is chosen from the one or more previously captured portions of the video associated with the video conference.

16. The computing system of claim 15 further configured to perform operations comprising:
   rendering the temporally-different portion of the video associated with the video conference.

17. The computing system of claim 11 wherein the viewer application includes one or more of:
   a question submission application;
   an applause generation application;
   a feedback submission application;
   a file submission application; and
   a chatting application.

18. The computing system of claim 17 wherein the stored viewer response data event includes one or more of:
   a temporal question submitted via the question submission application;
   a temporal applause score generated via the applause generation application;
   a temporal feedback score generated via the feedback submission application;
   a temporal data file submitted via the file submission application; and
   a temporal chat entry submitted via the chatting application.

* * * * *